United States Patent [19]

Yamaoka et al.

[11] Patent Number: 4,692,891

[45] Date of Patent: Sep. 8, 1987

[54] CODED DECIMAL NON-RESTORING DIVIDER

[75] Inventors: Akira Yamaoka, Hatano; Kenichi Wada, Sagamihara; Kazunori Kuriyama, Hatano, all of Japan

[73] Assignee: Hitachi, Ltd., Tokyo, Japan

[21] Appl. No.: 668,842

[22] Filed: Nov. 6, 1984

[51] Int. Cl.$^4$ .............................................. G06F 7/52
[52] U.S. Cl. .................................. 364/763; 364/762; 364/766
[58] Field of Search .................... 364/763, 762, 766

[56] References Cited

U.S. PATENT DOCUMENTS

| | | | |
|---|---|---|---|
| 3,735,108 | 5/1973 | Bolt et al. ............................. | 364/763 |
| 4,466,077 | 8/1984 | Iannucci et al. ..................... | 364/763 |
| 4,603,397 | 7/1986 | Ohtsuki et al. ....................... | 364/763 |

OTHER PUBLICATIONS

Markin, "Implementation of Division Algorithm Halves Iteration Time" Computer Design Jul. 1979, pp. 129–134.

Lemaire et al., Improved Non-Restoring Division"

IBM Tech. Disclosure Bulletin, vol. 23, No. 3, Aug. 1980, pp. 1149–1151.

Primary Examiner—David H. Malzahn
Attorney, Agent, or Firm—Antonelli, Terry & Wands

[57] ABSTRACT

This invention employs a construction in which subtraction processing and digit shift processing in decimal division are carried out in parallel with each other to shorten the time required for decimal division.

A dividend is stored in a register B and a divisor, in a register C. A selector 6 selects register B when the result of subtraction by an adder/subtracter 1 is positive or zero, and selects register A at other times. Both adder/subtracter 1 and a shifter 2 receive the signal from the selector 6 in the same way, and execute the subtraction processing and the shift processing, respectively. The results of these processings are stored in the registers B and A', respectively.

The division time can be shortened because the adder/subtracter 1 and the shifter 2 can be actuated simultaneously.

16 Claims, 4 Drawing Figures

12210 ÷ 6 = 201 ... 4

| STEP | REG A' | REG B | REG C | CARRY | SUBTRACT COUNTER |
|---|---|---|---|---|---|
| STEP 0 | | 0012 10C0 | 0600 0000 | * | 0 |
| STEP 1 | SHIFT B 0121 0C0C | B←B-C 9412 10C0 | 0600 0000 | 0 | 0 |
| STEP 2 | SHIFT A 1210 C00C | B←A'-C 9521 0C0C | 0600 0000 | 0 | 0 |
| STEP 3 | SHIFT A 210C 000C | B←A'-C 0610 C00C | 0600 0000 | 1 | 1 |
| STEP 4 | SHIFT B 610C 001C | B←B-C 0010 C00C | 0600 0000 | 1 | 2 |
| STEP 5 | SHIFT B 010C 002C | B←B-C 9410 C00C | 0600 0000 | 0 | 0 |
| STEP 6 | SHIFT A 10C0 020C | B←A'-C 950C 002C | 0600 0000 | 0 | 0 |
| STEP 7 | SHIFT A 0C00 200C | B←A'-C 04C0 020C | 0600 0000 | 1 | 1 |
| STEP 8 | SHIFT B 4C00 201C | B←B-C 98C0 020C | 0600 0000 | 0 | 0 |

FIG. 4

CODED DECIMAL NON-RESTORING DIVIDER

BACKGROUND OF THE INVENTION

This invention relates to a method and apparatus for decimal division.

Among operation instructions, a decimal division instruction is one that requires particularly large operation cycles and for this reason, it is difficult to improve the operation speed.

A heretofore known decimal division system employs two registers A and C, an adder/subtracter 1, a shifter 2, a subtraction count portion 3 and a carry detector 4, as shown in FIG. 1. In order to effect division, a dividend is stored in register A and the divisor, in register C, respectively. The adder/subtracter reduces the dividend by the amount of the divisor 1, and the result 1A is returned to register A through a selector 5. When the result of subtraction proves to be positive or zero, a carry signal is detected by the carry detector 4, and a gate 10 is opened so that the value of the subtraction count portion 3 becomes "1". The content of register C is repeatedly subtracted from the content of register A until the result of subtraction proves to be negative; the result 1A is returned to register A, and the value of the subtraction count portion 3 is incremented by +1 whenever a carry occurs.

When the result of subtraction proves to be negative, the value of the subtraction count portion 3 becomes the result digit, an is set to be the uppermost digit of the quotient. At the same time, the content of register A and that of register C are added by the adder/subtracter 1, and then returned to the result of the final positive subtraction; the result is stored in register A through the selector 5. Next, the content of this register A is shifted one digit to the left by the shifter 2. That is, it is shifted four bits to the left when a single digit is expressed by four bits. The result 2A is returned to register A through the selector 5.

Next, the content of this register A as a new dividend is reduced by the amount of the divisor in register C, and the result of subtraction is returned to register A through the selector 5. The value of the subtraction count portion 3 is incremented by +1 by the carry detected by the carry detector 4, and the number of the succeeding digits of the quotient is counted.

As described above, the following problems must be solved in order to speed up the operation speed of the decimal division system shown in FIG. 1.

(1) The system consists of a double loop, a subtraction loop and a shift loop for each digit, and these loop processes must be carried out in time sequence.

(2) The process that increments by +1 in the subtraction count portion whenever a carry occurs and which generates the result digit is necessarily separate from the loop process described above.

(3) The process of adding the content of the register C to that of register A is essentially necessary to obtain a partial quotient for a single digit.

To solve only problem (3), a decimal division system has so far been proposed (e.g., Japanese Patent Publication No. 6587/1981).

FIG. 2 is a block diagram of the decimal division system disclosed in the reference described above.

In FIG. 2, a register B has been added so that the results of subtraction by the adder/subtracter 1 are alternately stored in registers A and B, and when a carry no longer occurs, the content of one of the registers which store the positive result is shifted one digit by the shifter 2 and is returned to register A or B, and subtraction is thereafter repeated.

To explain this process more precisely, the problem 1210÷6=201 with the remainder 4 will be computed.

(a) First of all, "01210000" is stored in register A, and "06000000" is left-packed in register C.

(b) Next, the content of register C is subtracted from the content of register A by the adder/subtracter 1. (Since "06000000" is greater than "01210000", the complement of "06000000", that is, 100000000−06000000=94000000, is added). The result of subtraction, i.e., "95210000", is stored in register B. In this instance, no carry occurs.

(c) The content of register A is shifted one digit (4 bits) to the left, and "12100000" is stored in register A.

(d) The content of register C is subtracted from the content of register A by the adder/subtracter 1, and the result "06100000" is stored in register B. In this case, since a carry occurs, the value of the subtraction count portion 3 becomes "1".

(e) Next, the content of register C is subtracted from the content of register B, and the result "00100000" is stored in register A. Since a carry occurs in this case, the value of the subtraction count portion 3 becomes "2".

(f) The content of register C is subtracted from the content of register A, and the result "94100000" is stored in register B. In this case, the counter is cleared because no carry occurs.

(g) The content of register A is shifted four bits to the left, and "01000000" is stored in the register A.

(h) The content of register C subtracted from the content of register A, and the result is stored in register B. However, since no carry has occurred yet, the content of register A is again shifted four bits to the left, and "10000000" is stored in the register A.

(i) Next, the content of register C is subtracted from the content of register A, and the result "04000000" ia stored in register B. Since a carry occurs in this case, the value of the subtraction count portion 3 becomes "1".

(j) The content of register C is then subtracted from the content of register B, and the result "98000000" is stored in register A. In this case, since no carry occurs, the counter is cleared, and the result is taken as the result digit.

As described above, in FIG. 2, the content of the other register can be used even if either one of the registers, A or B, is negative; hence, the process of adding the divisor to the negative result of subtraction and the computing time can be shortened. Also, since the remainder exists in either of the registers, in the register B in the example described above, it can be simply read out.

To further speed up decimal division instructions, further improvement can no longer be expected because the afore-mentioned problems (1) and (2) have been left yet unsolved.

SUMMARY OF THE INVENTION

It is therefore an object of the present invention to provide a method and apparatus for decimal division which can eliminate the problems of the prior art systems described above, and can further shorten the computing time by eliminating the post-processing time for synthesizing the quotient and the remainder, without processing in time sequence the subtraction loop and the one digit shift loop or without adding the positive or negative codes to the result.

To accomplish the object of the invention described above, in a decimal division system which subtracts the divisor from the dividend at least once and effects the digit shift for the computation of the next digit when the result of subtraction proves to be negative, the decimal division system of the present invention executes the digit shaft simultaneously with the subtraction of the divisor from the dividend, and this subtraction is executed while the result of subtraction contains the quotient and a code representing positive or negative.

BRIEF DESCRIPTION OF THE DRAWINGS

FIG. 4 is a schematic view useful for explaining the dividing operation on the basis of the decimal division system in accordance with the present invention.

DESCRIPTION OF THE PREFERRED EMBODIMENTS

Hereinafter, some preferred embodiments of the invention will be described with reference to the accompanying drawings.

Figure 1:
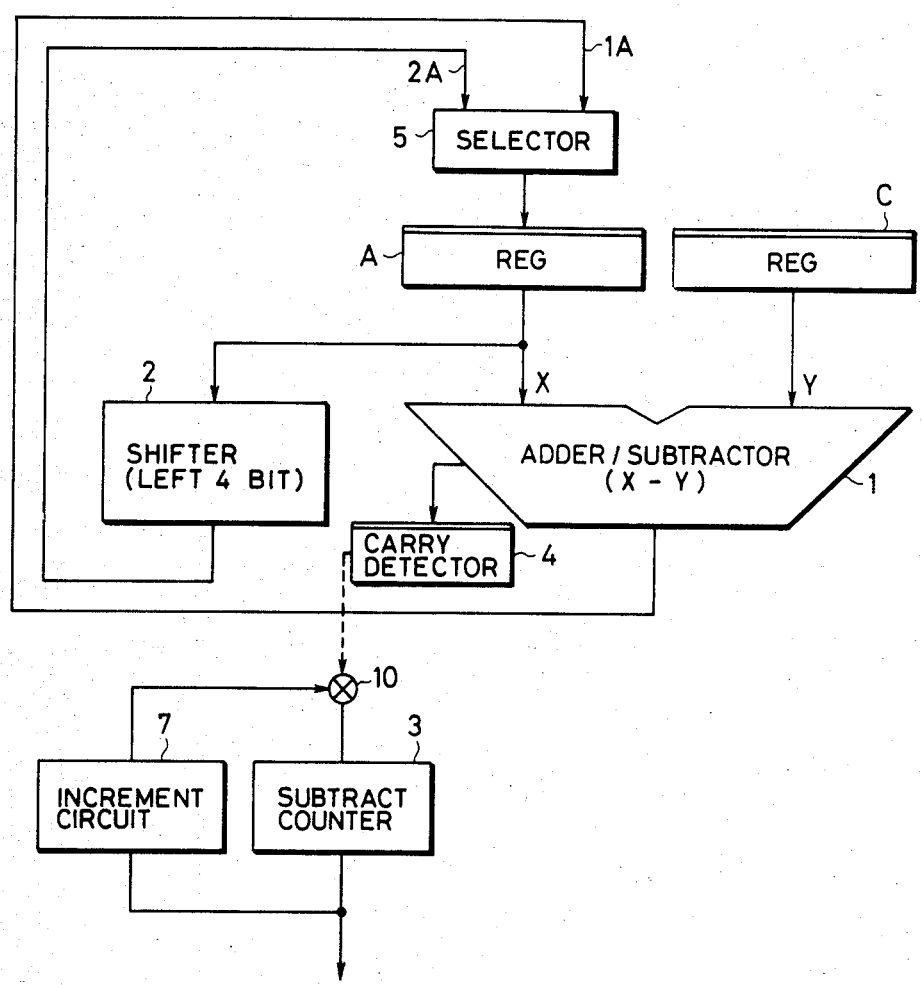
FIGS. 1 and 2 are block diagrams of the conventional decimal divison systems.
Figure 2:
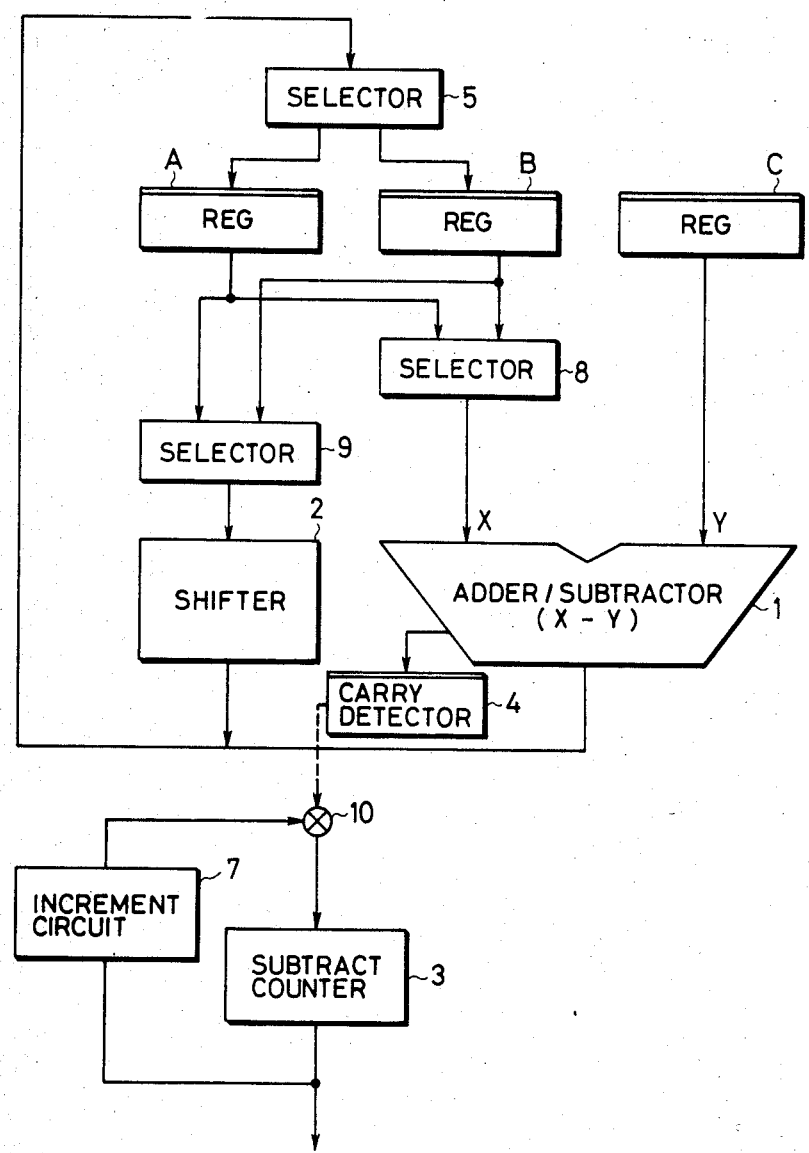
Figure 3:
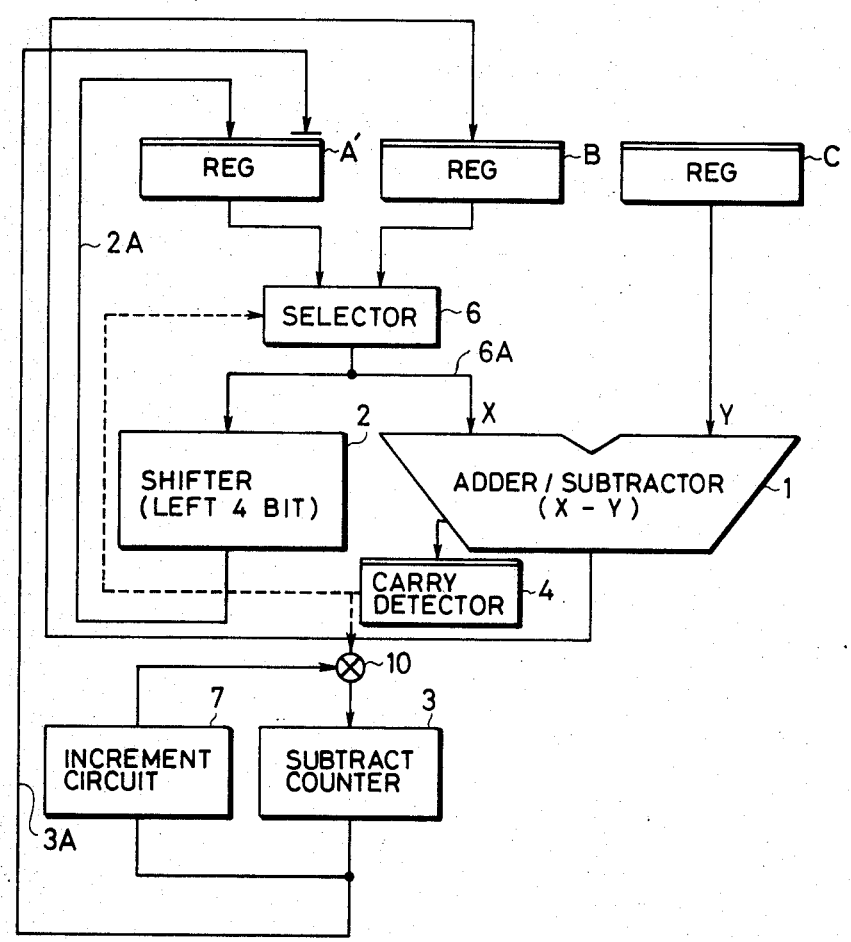
FIG. 3 is a block diagram of the decimal division system in accordance with one embodiment of the present invention.

FIG. 3 is a block diagram showing the decimal division system in accordance with one embodiment of the present invention.

The decimal division system shown in FIG. 3 includes a register B for storing the divided and the result of subtraction, a register C for storing the divisor, an adder/subtracter 1, a shifter 2, a subtraction count portion 3, a carry detector 4 for detecting a carry signal from the adder/subtracter 1, a register A' for storing the result of the shifter 2 and the result of the subtraction count portion 3, a selector 6 for selecting the outputs from the registers A' and B, and an increment circuit 7 for storing again a value, obtained by adding 1 to the content of the subtraction count portion 3, in the subtraction count portion 3 whenever the carrier detector 4 detects the carry signal.

The operation of the system shown in FIG. 3 will be outlined.

(a) First of all, the content of register C, storing the divisor, is subtracted by the adder/subracter 1 from the content of the register storing the dividend, usually register B, and when the result of previous subtraction is negative, register A', the result of subtraction is stored whenever subtraction is made and at the same time, the number of subtractions having results that are positive or zero are counted by the subtraction count portion 3.

(b) The content of the register storing the dividend or the result of subtraction, usually register B, and when the result of previous subtraction is negative, the register A', is shifted 2 in parallel with the processing of (a) and at the same time, the content of the subtraction count portion 3 is stored in the lowermost part of the register A'.

(c) When the result of subtraction becomes negative and a carry signal is no longer generated by the adder/subtracter 1, the processings of (a) and (b) are repeated desired number of times with the content of the register A' being a new dividend.

Incidentally, since the system processes a decimal number in which a single decimal digit consists of four bits, the shifter 2 shifts one digit, that is, four bits, to the left. The decimal division system shown in FIG. 3 can be applied to a computer in a micro-program control system, for example, and in such a case, the operation of each portion is controlled by micro-instructions stored in control memories.

The dividing operation in FIG. 3 will be explained with reference to a definite example of $1210 \div 6 = 201$ with the remainder 4.

FIG. 4 tabulates the register contents at each step of the dividing operation in accordance with the decimal division system of the present invention.

Incidentally, symbol "C" in "0001210C", for example, in the following description is a portion representative of the positive or negative code, and is given by a symbol other than 0 through 9. This symbol uses one digit (four bits) at the extreme eight of each operand. In FIG. 4, C at the extreme right of the operand is the positive code.

(a) First of all, the digits are arranged for the dividend and the divisor in a predetermined manner, and the dividend and the divisor are then stored in the registers B and C, respectively. The digits are arranged so that the dividend is left-shifted one digit from the left-justified state, while the divisor is shifted by one digit to the right from the left-justified state in which the symbol portion is zero-cleared. Here, the term "left-justified" means the state in which, when the register length is R byte and the operand data length is n byte (with the proviso that R>n), the operand data is stored in the former half (left side) n byte, and "0s" (zeros) are all stored in the remaining R-n bytes. In the example shown in FIG. 4, the register length R=8 bytes, the dividend length is presumed to be 4 bytes and the divisor length is presumed to be 1 byte. Therefore, when the dividend=1210 and the divisor=6, the dividend is treated as "0001210C" (4 bytes) and the divisor is treated as "6C" (one byte). The dividend "0001210C" does not change even if it is left-justified, because the register length R is equal to the presumed data length of the dividend. The divisor "6C" changes into "6C000000" (4 bytes) after it is left-justified, because the difference between the register length and the length of the divisor is equal to "3". In our embodiments, the dividend "0001210C", after left-justification is further shifted one digit to the left from the left-justified state to "001210C0" and is then stored in the register B, while the divisor 6C000000 after left-justification is changed to 60000000 by changing the code portion C to 0, is then shifted one digit to the right from the left-justified state "60000000" to "06000000", and this is then stored in the register C.

In this manner, the dividend and the divisor are stored in registers B and C, respectively, at step 0 in FIG. 4.

(b) The value of the subtraction count portion 3 is reset to "0".

(c) Initialization is made so that the selector 6 selects register B on the line 6A.

(d) The content of register C, storing the divisor, is subtracted from the content of the selector 6, storing the dividend at first, given through the outline 6A by the adder/subtracter 1, and the result of subtraction is stored in register B. The carry from the adder/subtracter 1 is transmitted to the carry detector 4. At the same time, the result obtained by shifting one digit to the left, the content of the selector 6 by the shifter 2 and the result of the subtraction count portion 3 are stored in register A' through the lines 2A and 3A, respectively.

The line 3A is connected to the extreme right byte of register A', and the line 2A, to the reset of bytes, respectively (at step 1 in FIG. 4). Incidentally, at the step 0 in FIG. 4, since the divisor is greater than the dividend, the complement "94000000" is added to the content "001210C0" of the register B in order to effect subtraction, and the result "941210C0" is stored in the register B. Since the carry does not occur at the step 0, the value of the subtraction count portion remains "0", and "0C" is sent along the line 3A and is stored in the last two digits (1 byte) of register A'. "01210C" of the line 2A as the output of the shifter 2 is stored in the upper six digits (3 bytes) of register A'.

(e) When the difference between the diviend and the divisor proves negative as a result of the processing (d) described above, that is, when the carry is "0", the value of the subtraction count portion 3 and the result of this portion 3 are stored in register A' at the next step through the line 2A and the output line 3A, respectively. The content of the register A' becomes 210C00C (at the step 3 in FIG. 4).

(f) When the result between the dividend and the divisor proves to be positive or "0" at the previous step as a result of the processing (d) described above, that is, when the carry is "1", the content of the subtraction count portion 3 is incremented by +1, and the content of register B is produced to the output line 6A of the selector 6, thereby returning to the step (d).

For example, since the result of the step 3 shown in FIG. 4 represents that the carry is "1", the content of register C is subracted from the content of register B at the step 4. Then, the result of subtraction "0010C00C" is stored in register B and at the same time, the result obtained by shifting by one digit to the left the content of register B by the shifter 2 and the result of the subtraction count portion 3 is stored in register A' through the line 2A and the output line 3A, respectively (at the step 4).

Since the carry is "1" and the subtraction count value is "2" at the previous step, the result of subtraction of the content of register C from the content of the register B (here, the complement is added), i.e., "94", is reset to "0" at the next step 5, and the content of the register A' is produced to the output line 6A of the selector, thereafter returning again to the step (d).

For example, the result of step 1 shown in FIG. 4 shows that the difference between the dividend X and the divisor Y is negative, that is, the carry is "0". Threfore, subtraction or the addition of the complement "94000000" of the divisor Y to the content "01210C0C" of register A' is made at the next step 2, and the result "95210C0C" is stored in register B. At the same time, the result obtained by shifting one digit to the left the content of register A' by the shifter 2 and the result of the subtraction count portion 3 are stored in register A' through the line 2A and the output line 3A, respectively. The content of register A' becomes "1210C00C" (step 2 in FIG. 4).

Since the carry is also "0" in accordance with the result of step 2 in FIG. 4, the content of register C is reduced from the content of register A' at the next step 3 in the same way as the previous step. In this case, the difference between the dividend and the divisor is positive, and "0610C00C" is stored in register B. The value of the subtraction count portion is reset to 0 and at the same time, the result obtained by shifting one digit to the left the content of register A' by the shifter 2 and "10C00C" are stored in register B, and on the line 2A as a result of shifting by one digit to the left the content of the register B and the output line 3A of the count portion 3 become "010C002C" and is stored in the register A' (step 5).

Since the steps 6, 7 and 8 are executed in the same way as described above, the explanation is for these steps is omitted.

(g) The processes (d), (e) and (f) are carried out a predetermined number N times until a carry occurs, and this number of times N can be determined by the following operation with the length of the dividend and that of the divisor being represented by n1 bytes and n2 bytes, respectively:

$$N = 2(n1 - n2) - 1$$

For example, the predetermined number of times in FIG. 4 is such that the length of the dividend $n1 = 4$ bytes and that of the divisor $n2 = 1$ byte, and is given as $2(n1 - n2) - 1 = 5$ (times). In other words, when the number of times of subtraction, in which no carry occurs, reaches 5, the quotient having a desired digit number can be obtained. In the example shown in FIG. 4, subtraction is made eight times in all by adding the number of times 3 of subtraction in which the carry has occurred.

As a result, in the example shown in FIG. 4, "4C00201C" is stored in register A'. The former halfbyte of this register A' represents the remainder "4C" and the other three bytes are the quotient "201C". Therefore, $1210 \div 6 = 201$ with a remainder 4 can be obtained.

As described above, the present invention subtracts the content of register C from the content of register A' or B, and stores the result of subtraction in register B. In this case, the content of register B is used when the carry is "1" at the preceding step, and the content of register A' is used when the carry is "0". Also, the content of register B is used at the beginning. At the same time, the content of register A' or B is shifted one digit by the shifter and is stored in register A', and in this case, too, the content of register A' or B', which is used for subtraction at that step, is shifted. Furthermore, the output of the subtraction counter is stored in the extreme right byte of register A', and subtraction or shift is carried out while the contents of registers A' and B contain the positive and negative codes.

In such a computer, one in which the quotient is stored in the former half $n1 - n2$ bytes and the remainder, in the latter half n2 bytes, and which uses the total n1 byte data as the calculation result, the desired result of calculation can be obtained by cycle-shifting by n2 bytes to the left the final result of register A'. Therefore, the step of synthesizing the quotient and the remainder can be eliminated. When the result of the $n2 = 1$ byte register A' shown in FIG. 4 is cycle-shifted to the left, for example, the result proves to be "00201C4C", and hence the quotient can be obtained in the former half $n1 - n2 = 3$ bytes and the remainder, in the latter half $n2 = 1$ byte.

As described above, in the decimal division system, the present invention executes the process of subtracting the divisor from the dividend in parallel with the carry shift processing for the calculation of the next digit, and eliminates the step of adding the content of register C as the divisor to the content of register B which is excessively subtracted. Moreover, the present invention executes subtraction while the code and the intermediate result of quotient are being added to the result of subtraction, so that the invention can also eliminate the steps of adding the code to the result and synthesizing the quotient and the remainder. For these reasons, the present invention can speed up the calculation loop as well as the subsequent processing.

What is claimed is:

1. A decimal division apparatus comprising:
   a first register for storing a dividend;
   a second register;
   a third register for storing a divisor;
   a selection circuit for first selecting a signal from said first register and for thereafter selecting a signal from either of said first and second registers depending on whether or not a first signal is applied thereto;
   a subtracter circuit including means for subtracting the signal in said third register from the signal selected by said selection circuit, means for storing the result of subtraction in said first register, and means for generating said first signal when the result of subtraction is not negative;
   a shift circuit for shifting the signal selected by said selection circuit by one digit portion, and for storing the shift result in said second register; and
   a counting circuit for counting the number of said first signals generated by said generating means.

2. A decimal division apparatus according to claim 1 wherein said second register is connected to said counting circuit for storing the number counted by said counting circuit.

3. A decimal division apparatus according to claim 1 wherein said dividend contains a sign code portion representing a sign thereof.

4. A decimal division apparatus according to claim 1 wherein said first, second and third registers each store one four-bit digit of a decimal number.

5. A decimal division circuit according to claim 4 wherein said second register is connected to said counting circuit for storing at the extreme right byte position thereof the number counted by said counting circuit.

6. A decimal division apparatus according to claim 1 wherein said shift circuit executes the shifting operation in parallel with the subtracting operation of said subtracter circuit.

7. A method of decimal division including a first register for storing a dividend signal, a second register, a third register for storing a divisor signal, a subtracter and a counter, said method comprising:
   (a) selecting the output signal of said first register;
   (b) subtracting a signal from said third register from the selected output signal by means of said subtracter, producing a first signal when the result of subtraction is not negative, storing the result of subtraction in said first register, shifting said selected output signal and storing the shift result in said second register;
   (c) increasing the content of said counter when said first signal is generated in step (b); and
   (d) repeating steps (a) to (c) in which step (a) comprises selecting the output of said first register or the output of said second register depending on whether or not said first signal is generated in the previous execution of step (b).

8. A method of decimal division according to claim 7 wherein the repetition of step (d) is stopped when the number of first signals produced in step (b) reaches a predetermined number.

9. A method of decimal division according to claim 7, further comprising, prior to step (a), storing said divisor in said third register in the state in which it is shifted by one digit to the right from the left-justified state in which a sign code portion of said divisor signal is cleared to zero.

10. A method of decimal division according to claim 7 wherein, in the storing of the result of subtraction in the step (b), the output of said counter is stored at part of said second register.

11. A method of decimal division according to claim 7 wherein said subtraction processing at said step (c) and said shift processing are carried out in parallel with each other.

12. A method of decimal division according to claim 7 wherein said subtraction processing is carried out by adding the complement of said divisor.

13. A decimal division apparatus, comprising:
    subtracter means for performing a subtraction operation on a pair of decimal inputs so as to provide a result data signal corresponding to the result of the subtraction and for providing a carry signal when the result of the subtraction is not negative;
    first register means connected to said subtracter means for initially holding the dividend and for receiving a result data signal provided by said subtracter means in synchronism with each subtraction operation performed thereby; and
    second register means connected to said shift means for receiving shifted data signals provided thereby in synchronism with each subtraction operation performed by said subtracter means; and wherein
    said selecting means is connected to said first and second register means for first providing the dividend held by said first register means to said shift means and to said subtracter means, as a first minuend, and for thereafter sequentially providing succeeding minuends, by selecting a data signal held by said first register and a data signal held by said second register as a succeeding minuend in synchronism with each subtraction operation performed by said subtracter means for a pair of a preceding minuend and the divisor and depending upon whether or not a carry signal is provided by said subtracter means as a result of the subtraction.

14. A decimal division apparatus, according to claim 13, wherein said second means includes means for combining an output of said count means together with a data signal provided by said shift means so that the combined data is provided as one of the succeeding minuends.

15. A decimal division apparatus, according to claim 13, wherein said second means includes:
    first register means connected to said subtracter means for initially holding the dividend and for receiving a result data signal provided by said subtracter means in synchronism with each subtraction operation performed thereby; and
    second register means connected to said shift means for receiving shifted data signals provided thereby in synchronism with each subtraction operation performed by said subtracter means; and wherein said selecting means is connected to said first and second register means for first providing the dividend held by said first register means to said shift means and to said subtracter means, as a first minuend, and for thereafter sequentially providing succeeding minuends, by selecting a data signal held by said first register and a data signal held by said second register as a succeeding minuend in synchronism with each subtraction operation performed by said subtracter means for a pair of a preceding minuend and the divisor and depending upon whether or not a carry signal is provided by said subtracter means as a result of the subtraction.

16. A decimal division apparatus, according to claim 15, wherein said second register means has a first storage portion connected to receive a data signal provided by said shift means and a second storage portion connected to receive an output of said count means.

* * * * *